July 7, 1942.   E. M. CLAYTOR   2,288,938
SOLENOID UNIT FOR CONTROLLING AUTOMOBILE OVERDRIVES
Filed Dec. 9, 1940
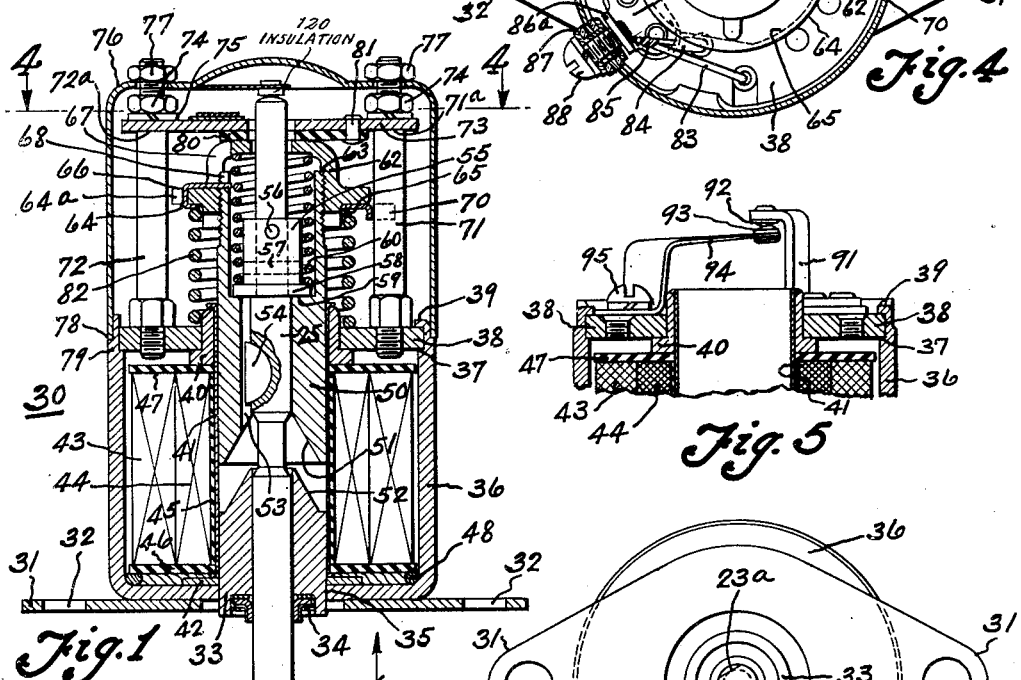
INVENTOR
Edward M. Claytor
BY
Spencer Hardman & Fehr
his ATTORNEYS Patented July 7, 1942

2,288,938

UNITED STATES PATENT OFFICE 2,288,938

SOLENOID UNIT FOR CONTROLLING AUTOMOBILE OVERDRIVES

Edward M. Claytor, Anderson, Ind., assignor to General Motors Corporation, Detroit, Mich., a corporation of Delaware Application December 9, 1940, Serial No. 369,245

3 Claims. (Cl. 175—341)

This invention relates to the electrical controls for automobile overdrives and more particularly to the solenoid unit which actuates the sun gear locking pawl. In the manufacture of overdrives it has been the practice to make the sun gear locking pawl a part of the overdrive assembly and to make the rod for transmitting motion from the solenoid unit to the pawl a part of the solenoid unit. The pawl and the pawl rod are connected together during the assembly of the solenoid unit upon the overdrive housing.

It is desirable to effect the connection between the pawl rod and the pawl by a movement longitudinally of the pawl rod, to cause the rod to enter a socket provided by the pawl, followed by partial rotation of the pawl rod to cause the pawl rod to be locked to the pawl. Since the pawl rod is a part of the solenoid assembly, the longitudinal movement of the pawl rod may be effected by moving the whole solenoid assembly in that direction until the base of the assembly engages the housing of the overdrive. Then the entire assembly may be rotated about the axis of the pawl rod to effect the partial turning of the pawl rod so that it will be locked in the socket of the pawl. In order to provide for turning the pawl rod by turning the solenoid unit, the pawl rod should not be rotatable relatively to the solenoid unit.

It is, therefore, an object of the present invention to provide a solenoid unit in which the pawl rod is prevented from rotating relatively to the unit while providing for relative longitudinal movement between the pawl rod and the solenoid armature. This latter provision is required in solenoid units which operate electromagnetically to push the pawl into engagement with the sun gear locking ring. The assembler of such a solenoid unit with an overdrive assembly grasps a solenoid unit at the end remote from that end through which the pawl rod extends, and moves the solenoid unit so that the pawl rod passes through an opening in the overdrive housing, said opening guiding the pawl rod into the socket of the pawl. This movement causes the base of the unit to rest upon a mounting pad of overdrive housing. Then the unit is turned upon the mounting pad until certain holes in the base of the unit register with tapped holes in the overdrive housing. Such turning of the unit causes the pawl rod to be turned so that it will be locked into connection with the pawl. With the solenoid unit in this position, it is secured to the overdrive housing by suitable screws which pass through the holes mentioned.

Further objects and advantages of the present invention will be apparent from the following description, reference being had to the accompanying drawing wherein a preferred embodiment of the present invention is clearly shown.

In the drawing:

Fig. 1 is a longitudinal sectional view of the solenoid unit taken on the line 1—1 of Fig. 2.

Fig. 2 is an end view with the solenoid cover shown in section.

Fig. 3 is a fragmentary view showing one of the solenoid switches and is viewed in the direction of the arrow 3 of Fig. 2.

Fig. 4 is a sectional view on line 4—4 of Fig. 1.

Fig. 5 is a fragmentary longitudinal sectional view through the electromagnet and it shows a side elevation of another of the solenoid switches.

Fig. 6 is a bottom end view of the unit and is taken in the direction of arrow 6 of Fig. 1.

Fig. 7 is a fragmentary side elevation of the pawl rod locked in engagement with the pawl.

Fig. 8 is an enlarged fragmentary view showing the manner in which the pawl rod end is locked in engagement with the pawl.

Referring to Figs. 7 and 8, a pawl 20 used for locking the overdrive sun gear (not shown) is mounted for sliding movement in ways 21 and 22. It is provided with a socket defined by parallel portions 23 spaced apart to receive the cylindrical end portion 24 of pawl rod 25. The pawl socket is defined by surfaces 26 to receive the wings 27, extending laterally from the cylindrical portion 24. The pawl rod 25 is connected with the pawl 20 by turning the pawl rod so that the wing portions 27 on the end of the pawl rod will be located crosswise of the pawl 20 in order that the wings 27 may be entered between the surfaces 23 as shown in Fig. 8. Then the pawl rod is moved axially until it bottoms in the recess or socket of the pawl in order to bring the wings 27 into alignment with the surfaces 26 of the pawl 20. Then the pawl rod 25 is rotated 90° from the position shown in full lines to the position shown in dot-dash lines, thus bringing the wings into the position 27a in Fig. 8. Then the pawl rod is locked in its connection with the pawl.

Referring to Figs. 1 and 6, it will be seen that the pawl rod 25 is a part of a unitary assembly 30 known as the solenoid unit. The unit 30 comprises a mounting bracket 31 having apertured ears 32 for receiving screws which attach the unit to the housing of the overdrive. The bracket 31 is centrally apertured to receive a magnetizable solenoid core 33 which is centrally apertured to receive a pawl rod 25 which is slidable through a packing device 34 to prevent the escape of excessive amount of lubricating oil from the overdrive housing into the solenoid unit.

The core 33 extends through an opening 35 in a cup-shaped magnetizable housing 36 which is spot-welded to the plate 31. Housing 36 is provided at its upper end with a counterbore to provide a shoulder 37 for receiving a magnetizable plate 38 secured against the shoulder 37 by riveting over portions 39 of the housing 36. Plate 38 is centrally apertured to receive a magnetizable bushing 40 which is centrally apertured to receive a non-magnetizable tube 41 which fits around the core 33 and extends against a washer 42. Core 33 is surrounded by magnet coils 43 and 44, coil 43 being the main attracting coil and coil 44, the armature holding coil. These coils are wound around an insulating tube 45 through which the tube 41 passes and are confined between end discs 46 and 47. Disc 46 is urged against a packing ring 48 of insulating rope. Disc 47 is engaged by the bushing 40. In this way, the magnet coils are rigidly held in position within the cup 36 when the tangs 39 thereof are riveting over against the plate 38. Plate 38 is provided with suitable openings for bringing out the terminal wires or leads which are attached to certain terminals and switch parts to be described.

The tube 41 provides for the sliding movement of an armature 50 having a conical cavity 51 to conform to the conical tubular boss 52 of the core 33. Armature 50 is provided with a groove 53 for receiving a key 54 fixed within a notch provided by the pawl rod 25. In this way, relative rotation between rod 25 and armature 50 is prevented while providing for relative longitudinal movement between these parts. Rod 25 extends through a non-magnetizable sleeve 55 attached to rod 25 by pins 56 and 57. Sleeve 55 has a flange or collar 58 which normally seats against a shoulder 59 provided by armature 50 and is engaged by a spring 60 confined in a state of normal compression by a nut 62 threaded on screw threads 63 on the upper end of armature 50. The nut 62 has a flange 64, the under side of which is engaged by a plate 65 which is generally of ring formation and is provided with a tang 66 which, after the nut 62 has been threaded into the correct position relative to the armature 50, is bent into a flange notch 64a of the nut 62 and then into a slot 67 of the nut and then into a slot 68 of the armature 50. Thus the nut 62 is prevented from rotating with respect to the armature 50.

Rotation of the armature 50 with respect to the entire solenoid assembly is prevented by providing the plate 65 with a notched extension 70 which straddles a rod or post 71 attached at its lower end to plate 38. A similar post 72 parallels the post 71. The posts 71 and 72 are provided near their upper ends with shoulders 71a and 72a, respectively, for receiving a plate 73 secured by nuts 74 and lock washers 75. The upper ends of posts 71 and 72 extend through openings in a cup-shaped cover 76 and receive nuts 77 for securing the cover in position with its lower edge 78 bearing against a shoulder 79 provided by housing 36. The plate 73 supports on its underside, a non-metallic bumper plate 80 secured by rivet 81. Bumper plate 80 is engaged by nut 62 which normally bears against bumper 80 since the nut is urged upwardly by pawl rod return spring 82 confined in a normal state of compression between plate 65 and plate 38.

Wires 83 and 84 connected, respectively, with armature attracting coil 43 and with armature holding coil 44, are soldered at 85 to a bracket 86 insulatingly supported by plate 38. When the cover 76 is in proper location with respect to the housing 36, a bushing 87 insulatingly supported by cover 76 will be located in alignment with tapped hole in ear 86a of bracket 86. A terminal screw 88 is passed through the bushing 87 and is screwed into the tapped ear 86a of bracket 86 to provide means for connecting a wire electrically with the bracket 86 as well as providing means for holding cover 76 in position.

As stated before, wire 84 is connected with one end of a solenoid armature holding coil 44, the other end of which is grounded on the solenoid frame. One end of wire 83 is connected with armature attracting coil 43. The other end of attracting coil 43 is connected with wire 83a soldered at 90 to a bracket 91 insulatingly supported by plate 38 and carrying a contact 92 (Fig. 5) which is engageable with a contact 93 carried by a leaf spring contact bracket 94 secured by screw 95 to plate 38. Bracket 94 is directly grounded through the plate 38. The blade 94 has an ear 96 located in the path of movement of the flange 64 of nut 62. When terminal 88 is connected with a source of current, the solenoid coils 43 and 44 are both energized to attract armature 50 downwardly. As armature 50 moves toward core 52, nut flange 64 engages ear 96 of blade 94 thereby causing it to move downwardly (Fig. 5) to separate contact 93 from contact 94 in order to open circuit the solenoid attracting coil 43, leaving only the holding coil 44 energized to hold armature 50 in attracted position.

Downward movement of armature 50 (Fig. 1) causes pawl rod 25 to move downwardly and to force pawl 20 against a blocker ring, not shown. While the blocker ring obstructs downward movement of pawl, the armature 50 is caused to move downwardly and further to compress spring 60. The blocker ring is caused to move into such position as to free the pawl 20 at a time when there is a reversal of torque in the overdrive as explained in detail in my copending application 290,356, filed Aug. 16, 1939. When the blocking ring releases the pawl 20, it is moved into engagement with the sun gear locking ring by the spring 60, and rotation of the sun gear is prevented. When the sun gear is locked, the transmission is in overdrive.

To come out of overdrive, the current flow to the terminal 88 is interrupted so that holding coil 44 is deenergized thereby permitting spring 82 to move the armature 50 upwardly. Retraction of the pawl 20 from the sun gear locking ring is facilitated by interruption of engine ignition. In order to provide restoration of engine ignition in response to upward movement of pawl rod 25, there is provided a switch which comprises a contact bracket 100 insulatingly supported by plate 73 and attached thereto by rivets 101 which secure also a spacer 102 and a metal bracket 103 having a tapped hole 104 which, when the cover 76 is in the correct position, is in alignment with an apertured bushing 105 insulatingly supported by cover 76. Through bushing 105, a terminal screw 106 may be passed and be threadedly connected with the bracket 103 thus making an electrical connection between a wire secured by screw 106 with contact bracket 100. Bracket 100 carries a contact 111 normally spaced from a movable contact 110 carried by a leaf spring blade 112 grounded on plate 73 and attached thereto by rivets 113 which secure also a spacer 114, a spacer 115 and an angle bracket 116 having a tapped hole 117 which, when cover 76 is in the correct position, is in alignment with a bushing 118 apertured to receive a screw 119 which can be screwed into the threaded hole 117 of bracket 116. Contact blade 112 carries a non-conducting button 120 for engagement by the upper end 94 of pawl rod 25. When rod 25 returns to normal position shown, it engages button 120 and moves blade 112 upwardly to separate its contact 110 from the contact 111 of bracket 100 thus interrupting an ignition grounding circuit.

Referring to Fig. 6, it will be observed that the flats 23a of pawl rod 25 (spaced apart less than the distance between the flats 23 of pawl 20) bear a definite relation to the holes 32 in the bracket 31 of the solenoid unit 30. In assembling the unit 30 with the overdrive mechanism, the assembler grasps the unit 30 at its cover end and passes the pawl rod 25 through an opening in the overdrive housing in alignment with the pawl, and turns the unit 30, if necessary, so that the pawl rod end may enter between the flats 23 of the pawl 20. The assembler moves the unit toward the overdrive assembly until the bracket 31 engages a mounting pad provided by the overdrive housing. At this point in the assembly, the wings 27 of the pawl rod end will be adjacent the surfaces 26 of the pawl. Then the assembler turns the unit 30 while in contact with the mounting pad until the holes 32 of bracket 31 register with tapped holes in the mounting pad. The turning of unit 30 to register the holes of bracket 31 with the tapped holes in the mounting pad will cause the wings 27 of the pawl rod end to be turned into the positions 27a in Fig. 8, thus locking the pawl rod into connection with the pawl.

While the embodiments of the present invention as herein disclosed, constitute a preferred form, it is to be understood that other forms might be adopted, all coming within the scope of the claims which follow.

What is claimed is as follows:

1. A solenoid unit for controlling automobile overdrives comprising electromagnet windings, a magnetizable housing enclosing the windings and having an apertured end wall, a tubular armature movable within said aperture of the end wall, a pawl rod movable within the armature and longitudinally splined thereto to prevent rotation of the rod relative to the armature, means for transmitting movement from the armature to the rod, said means comprising a compression spring, a flange on the rod against which said spring bears, and a nut threaded on the armature against which said spring bears, a compression spring confined between the housing and the nut for urging the armature away from the windings, a stop for limiting movement of the armature away from the windings, means carried by the housing for supporting the stop means in spaced relation to the housing end wall, and means cooperating with the stop-supporting-means and with the armature to prevent rotation of the armature, said means having provisions detachably connecting the nut with the armature to prevent rotation of the nut relative to the armature.

2. A solenoid unit for controlling automobile overdrives comprising electromagnet windings, a magnetizable housing enclosing the windings and having an apertured end wall, a tubular armature movable within the aperture of the end wall, a pawl rod movable within the armature and longitudinally splined thereto to prevent rotation of the rod relative to the armature, a part provided by the pawl rod for engagement by a spring, a nut threadedly engaging the outer end of the armature, a compression spring engaging said nut and the pawl rod part for transmitting motion from the armature to the rod, a spring located between the nut and the housing end wall for urging the armature away from the windings, a post secured to the housing end wall and extending parallel to the armature, a stop supported by the post for limiting movement of the armature away from the windings, and a plate carried by the nut having a tang bendable into a recess provided by the armature for detachably securing the nut to the armature in a position of screw-threaded adjustment and having a portion making slidable engagement with the post in order to prevent rotation of the armature.

3. A solenoid unit for controlling automobile overdrives comprising electromagnet windings, a magnetizable housing enclosing the windings and having an apertured end wall, a cylindrical tubular armature movable within said aperture of the end wall, a pawl rod movable within the armature and longitudinally splined thereto to prevent rotation of the rod relative to the armature, a part provided by the pawl rod for engagement by a spring, a member carried by the armature, a compression spring located between the armature-carried member and the pawl rod part for transmitting movement from the armature to the rod, a spring surrounding the armature and located between the housing and the armature-carried member for urging the armature away from the windings, a stop for limiting movement of the armature away from the windings, means carried by the housing for supporting the stop means in spaced relation to the housing end wall and including a rod paralleling the armature and means attached to the armature carried member and slidably connected with said rod to prevent rotation of the armature while permitting longitudinal movement thereof.

EDWARD M. CLAYTOR.